US007055754B2

(12) United States Patent  (10) Patent No.: US 7,055,754 B2
Forster  (45) Date of Patent: Jun. 6, 2006

(54) SELF-COMPENSATING ANTENNAS FOR SUBSTRATES HAVING DIFFERING DIELECTRIC CONSTANT VALUES

(75) Inventor: Ian J. Forster, Chemsford (GB)

(73) Assignee: Avery Dennison Corporation, Pasadena, CA (US)

( * ) Notice: Subject to any disclaimer, the term of this patent is extended or adjusted under 35 U.S.C. 154(b) by 157 days.

(21) Appl. No.: 10/700,596

(22) Filed: Nov. 3, 2003

(65) Prior Publication Data

US 2005/0092845 A1  May 5, 2005

(51) Int. Cl.
G06K 19/06  (2006.01)

(52) U.S. Cl. .............................. 235/492; 343/700 MS

(58) Field of Classification Search ................ 235/492, 235/439, 441, 451; 343/700 MS, 795
See application file for complete search history.

(56) References Cited

U.S. PATENT DOCUMENTS

| 4,706,050 | A | * | 11/1987 | Andrews ............. 343/700 MS |
| 4,786,907 | A | * | 11/1988 | Koelle .................. 342/51 |
| 4,816,839 | A | * | 3/1989 | Landt .................... 343/795 |
| 5,430,441 | A | | 7/1995 | Bickley et al. ......... 340/10.2 |
| 5,491,483 | A | * | 2/1996 | D'Hont ................. 342/42 |
| 5,557,279 | A | | 9/1996 | D'Hont ................. 342/42 |
| 5,793,305 | A | * | 8/1998 | Turner et al. ......... 340/10.34 |
| 5,965,494 | A | * | 10/1999 | Terashima et al. ...... 333/235 |
| 6,133,836 | A | * | 10/2000 | Smith .................. 343/700 MS |
| 6,140,967 | A | * | 10/2000 | Kolsrud ............... 343/700 MS |
| 6,147,606 | A | | 11/2000 | Duan ................... 340/572.7 |
| 6,166,613 | A | * | 12/2000 | Nakagawa et al. ....... 333/205 |
| 6,236,314 | B1 | | 5/2001 | Smith et al. ........... 340/572.7 |
| 6,243,013 | B1 | * | 6/2001 | Duan et al. ........... 340/572.7 |
| 6,259,369 | B1 | | 7/2001 | Monico ................ 340/572.8 |
| 6,262,682 | B1 | * | 7/2001 | Shibata ................ 343/700 MS |
| 6,278,369 | B1 | | 8/2001 | Smith et al. ........... 340/572.7 |
| 6,278,413 | B1 | | 8/2001 | Hugh et al. ............ 343/818 |
| 6,281,850 | B1 | * | 8/2001 | Klostermann ........... 343/702 |
| 6,285,342 | B1 | * | 9/2001 | Brady et al. ............ 235/491 |
| 6,329,915 | B1 | * | 12/2001 | Brady et al. ......... 343/700 MS |
| 6,339,385 | B1 | | 1/2002 | Tuttle .................. 340/825.71 |

(Continued)

FOREIGN PATENT DOCUMENTS

EP  254954 A1 *  2/1988

(Continued)

OTHER PUBLICATIONS

International Search Report from Ser. No. PCT/US2004/011151, Filing Date Apr. 12, 2004.

*Primary Examiner*—Uyen-Chau N. Le
(74) *Attorney, Agent, or Firm*—Renner, Otto, Boisselle & Sklar, LLP

(57) ABSTRACT

An RFID tag or label includes a wireless communication system that is mounted in electrical proximity to the dielectric material. The wireless communication system includes a wireless communication device associated with an antenna system that has at least one conductive tab, including: a plurality of electrical components forming an impedance matching network, coupled to the conducting tab and wireless communication device, that electrically interact with the dielectric material to maintain a substantial impedance match between the antenna system and the wireless communication device; and/or a structural element forming a frequency selective by-pass trap circuit formed in the conducting tab, and electrically interacting with the dielectric material to maintain a substantial impedance match. The antenna system may be directly mounted on a dielectric substrate, which serves as the dielectric material, or alternatively may be mounted on a backing layer intermediate the dielectric substrate and the antenna system.

39 Claims, 4 Drawing Sheets

U.S. PATENT DOCUMENTS

| | | | |
|---|---|---|---|
| 6,501,435 B1 * | 12/2002 | King et al. | 343/795 |
| 6,504,511 B1 * | 1/2003 | Andersson | 343/702 |
| 6,535,175 B1 * | 3/2003 | Brady et al. | 343/795 |
| 6,563,463 B1 * | 5/2003 | Saito | 343/700 MS |
| 6,577,208 B1 * | 6/2003 | Kushitani et al. | 333/185 |
| 6,665,193 B1 | 12/2003 | Chung et al. | 361/760 |
| 6,667,092 B1 | 12/2003 | Brollier et al. | 428/182 |
| 6,838,377 B1 * | 1/2005 | Tonami et al. | 438/667 |
| 6,856,285 B1 * | 2/2005 | Bettin et al. | 343/700 MS |
| 2001/0053675 A1 | 12/2001 | Plettner | 455/91 |
| 2001/0054755 A1 | 12/2001 | Kirkham | 257/678 |
| 2002/0125566 A1 | 9/2002 | Hatada et al. | 275/728 |
| 2002/0175873 A1 | 11/2002 | Forster et al. | 343/767 |
| 2003/0210188 A1 * | 11/2003 | Hebron et al. | 343/700 MS |
| 2004/0001029 A1 | 1/2004 | Parsche et al. | 343/866 |
| 2004/0032377 A1 | 2/2004 | Forster et al. | 343/895 |
| 2004/0075607 A1 | 4/2004 | Cathey | 342/359 |
| 2004/0178912 A1 | 9/2004 | Smith et al. | 340/572.7 |

FOREIGN PATENT DOCUMENTS

| | | |
|---|---|---|
| GB | 2293050 A * | 3/1996 |
| WO | 00/43952 | 7/2000 |
| WO | 01/79988 | 10/2001 |
| WO | 01/80174 | 10/2001 |
| WO | 02/097723 | 12/2002 |
| WO | 03/009007 | 1/2003 |
| WO | 2004/025554 | 3/2004 |
| WO | 2004/036689 | 4/2004 |
| WO | 2004/046762 | 6/2004 |

* cited by examiner

SELF-COMPENSATING ANTENNAS FOR SUBSTRATES HAVING DIFFERING DIELECTRIC CONSTANT VALUES

BACKGROUND OF THE INVENTION

1. Field of the Invention

This invention relates generally to the field of Radio Frequency Identification (RFID) tags and labels, and, in particular, to Radio Frequency Identification (RFID) tags and labels that include a self-compensating antenna structure that self-compensates for the material to which it is attached to maintain a substantial impedance match with such material so as to allow efficient performance of the tag.

2. Description of the Prior Art

There is no simple definition of what constitutes an antenna, as all dielectric and conductive objects interact with electromagnetic fields (radio waves). What are generally called antennas are simply shapes and sizes that generate a voltage at convenient impedance for connection to circuits and devices. Almost anything can act to some degree as an antenna. However, there are some practical constraints on what designs can be used with RFID tags and labels.

First, reciprocity is a major consideration in making a design choice. This means that an antenna which will act as a transmitter, converting a voltage on its terminal(s) into a radiated electromagnetic wave, will also act as a receiver, where an incoming electromagnetic wave will cause/induce a voltage across the terminals. Frequently it is easier to describe the transmitting case, but, in general, a good transmit antenna will also work well as a receive antenna (like all rules, there are exceptions at lower frequencies, but for UHF, in the 900 MHz band and above where RFID tags and labels commonly operate, this holds generally true).

Nevertheless, even given the above, it is difficult to determine what is a 'good' antenna other than to require that it is one that does what you want, where you want and is built how you want it to be.

However, there are some features that are useful as guides in determining whether or not an antenna is 'good' for a particular purpose. When one makes a connection to an antenna, one can measure the impedance of the antenna at a given frequency. Impedance is generally expressed as a composite of two parts; a resistance, R, expressed in ohms, and a reactance, X, also expressed in ohms, but with a 'j' factor in front to express the fact reactance is a vector quantity. The value of jX can be either capacitive, where it is a negative number, or inductive, where it is a positive number.

Having established what occurs when one measures the impedance of an antenna, one can consider the effect of the two parts on the antenna's suitability or performance in a particular situation.

Resistance R is actually a composite of two things; the loss resistance of the antenna, representing the tendency of any signal applied to it to be converted to heat, and the radiation resistance, representing energy being 'lost' out of the antenna by being radiated away, which is what is desired in an antenna. The ratio of the loss resistance and the radiation resistance is described as the antenna efficiency. A low efficiency antenna, with a large loss resistance and relatively small radiation resistance, will not work well in most situations, as the majority of any power put into it will simply appear as heat and not as useful electromagnetic waves.

The effects of Reactance X are slightly more complex than that for Resistance R. Reactance X, the inductive or capacitive reactance of an antenna, does not dissipate energy. In fact, it can be lessened, by introducing a resonant circuit into the system. Simply, for a given value of +jX (an inductor), there is a value of −jX (a capacitor) that will resonate/cancel it, leaving just the resistance R.

So what is the problem? The problem is bandwidth, frequently described using the term Q (originally Quality Factor). To understand the effect, it is not necessary to understand the mathematics; simply, if an antenna has a value of +jX or −jX representing a large inductance or capacitance, when one resonates this out it will only become a pure resistance over a very narrow frequency band. For example, for a system operating over the band 902 MHz to 928 MHz, if a highly reactive antenna were employed, it might only produce the wanted R over a few megahertz. In addition, high Q/narrow band matching solutions are unstable, in that very small variations in component values or designs will cause large changes in performance. So high Q narrowband solutions are something, in practical RFID tag designs, to be avoided.

An RFID tag, in general, consists of two electrically active parts.

1) The RFID chip, containing rectifiers to generate a DC power supply from the incoming RF signal, logic to carry out the identification function and an impedance modulator, which change the input impedance to cause a modulated signal to be reflected; and,
2) An antenna as described above.

Graphically this arrangement can be represented as two blocks 54, 56 respectively, with two terminals each, as shown in FIG. 4, each with an associated impedance.

If the chip impedance (which tends to be capacitive) and the antenna impedance (which is whatever it is designed to be) are the conjugate of each other, then one can simply connect the chip across the antenna and a useful tag is created. For common RFID chips the capacitance is such that a reasonably low Q adequate bandwidth match can be achieved at UHF frequencies.

However, sometimes it is not so simple to meet operational demands for the tag due to environmental or manufacturing constraints, and then other ways of achieving a good match must be considered. The most common method of maintaining a desired impedance match, is to place between the antenna and chip an impedance matching network. An impedance matching network is usually a network of inductors and capacitors that act to transform both real and reactive parts of the input impedance to a desired level. These components do not normally include resistors, as these dissipate energy, which will generally lead to lower performance.

The problem is shown by describing what can happen to a non-adaptive tag as illustrated in FIG. 5 in a 'real world' situation.

FIG. 5 illustrates a simple structure as a half wave dipole 58 on a thin, 100 μm, polyester sheet 60. Each arm 62 is a quarter wavelength long. At 915 MHz in air, this would be 82 mm. The length of the two conductors and their width are set so that the antenna, when the label is held in free space (no dielectric or conductive object within a distance of about 3 m), and the relative dielectric constant of the environment is 1 (air), the impedance of the antenna is a perfect conjugate match to the chip 64. Also assuming that the conductors have a low resistivity and are made of a relatively thick copper, the antenna radiation resistance dominates the resistive part of its impedance. Thus, the antenna has good efficiency. So, when one tries to read this tag by illuminating it at a distance with an RF source, not surprisingly it works quite well, and, at adequate power and frequencies with common RFID chips there is a range of approximately 3 m.

Now if the environment is changed, as shown in FIG. 6, the "perfect" tag described above in FIG. 5, has now been stuck to a block 66 of plastic, 30 mm thick with a dielectric constant of 2.5, and not a dielectric constant of 1 as in air.

Now if one tries to read this tag, the read range is no longer found to be 3 m, but instead 0.5 m.

This change in read range is caused by the fact that the original antenna design was based on the assumption that the antenna was in air having a dielectric constant of 1, and mounted on a very small, thin layer of plastic, which only changes the effective dielectric constant the antenna 'sees' by a small amount. So, if one wanted the arms of the antenna to be, one-quarter wavelength long, the following formula would be applied:

$$C \text{ (speed of light, approximately } 3 \times 10^8 \text{ m/s)} = f \text{ (operating frequency Hz)} \cdot \lambda \text{(wavelength in } m\text{)}$$

Now however, stuck to a block of higher dielectric constant material, the antenna is no longer operating in a medium having a dielectric constant of 1. The effective dielectric constant of the block can vary with values between 1 and 2.5. For illustration purposes, let the antenna 'see' a dielectric constant of 2. The speed of light c is no longer $3 \times 10^8$ M/s in this medium. It actually reduced by the square root of the relative dielectric constant, and is now $2.12 \times 10^8$. Since c has dropped, at a given frequency, so has the wavelength λ, but the arms of the antenna are still the same length. A quarter wavelength is now approximately 58 mm, but the antenna has elements that are 82 mm in length. Hence the impedance presented to the chip by the antenna will no longer be a conjugate match, and incoming power is lost by reflection, explaining the reduction in read range for the tag.

If the tags were designed to be affixed to 30 mm blocks of plastic, and the blocks always have the same dielectric constant and size, the tags can be made with 58 mm long conducting arms and the range will go back up to near 3 meters.

But what if this is not the case? What if the tags are going to be used with blocks that are always 30 mm thick, but the dielectric constant of the blocks varies from 2 to 7 in an unpredictable way, which cannot be controlled in advance? Sometimes the 58 mm arms design will work very well. Much of the time it will not, as the chip and antenna will be badly mismatched, due to the effective dielectric constant, and hence wavelength, changing.

If each tag could be tuned individually, that is, adjust the arm length and/or add a matching network, consisting of adjustable capacitors and inductors, the tag could be made to work regardless of the dielectric constant of the block, but that would not be practical from a business perspective.

Therefore, for thin, label style tags designed to be attached to products, the performance of the tag when actually deployed on a specific product is an important, if not the most important, critical feature of the device. As discussed above, frequently designers optimize tag performance for 'free space', a datum generally given a nominal relative dielectric constant of 1. However, in the real world, the objects the labels are attached to frequently do not have a dielectric constant of 1, but instead have dielectric constants that vary widely. For example, a label having a dipole antenna designed and optimized for 'free space' that is instead attached to an object having a dielectric constant that differs from that of 'free space,' will suffer a degraded performance, usually manifesting itself as reduced operational range and other inefficiencies as discussed above.

Therefore, while products having differing fixed dielectric constant substrates can be accommodated by changing the antenna design from the 'free space' design to incorporate the new dielectric constant, this design change forces the tag manufacturer to produce a broader range of labels or tags, potentially a different type for each target product for which the tag may be applied, hence increasing costs and forcing an inventory stocking problem for the tag manufacturers.

When the tags are to be used on different types of materials that have a range of variable dielectric constants, the best design performance that can be achieved by the tag or label designer is to design or tune the tag for the average value of the range of dielectric constants and accept degraded performance and possible failures caused by significant detuning in specific cases.

The present invention deals with and solves the problems that arise in attempting to design and manufacture an antenna structure for use with an RFID tag or label that is to be mounted on surfaces having a wide range of dielectric constants.

Specifically, while it is unlikely a tag could be made that would perfectly compensate for all values of dielectric constant, the present invention is directed toward meeting the problems that arise in attempting to design and manufacture a tag capable of working on a variety of materials having a range of dielectric constant values, or on different manufacturers' products, to maintain a high performance efficiency for the tag or label.

SUMMARY OF THE INVENTION

It is an object of the present invention to provide an RFID tag or label that is capable of working on a variety of materials having a range of dielectric constant values, or on different manufacturers' products.

In general, the invention is embodied in an electronic labeling system in combination with a dielectric material and comprises a dielectric material and a wireless communication system that is mounted in electrical proximity to the dielectric material. The wireless communication system includes having a wireless communication device associated with an antenna system that has at least one conductive tab, including one or both of the following:

(a) a plurality of electrical components that are selected to form an impedance matching network, that are coupled to the conducting tab and wireless communication device. The electrical components electrically interact with the dielectric material to maintain a substantial impedance match between the antenna system and the wireless communication device; and, (b) a structural element forming a frequency selective by-pass trap circuit formed in the conducting tab and electrically interacting with the dielectric material to maintain a substantial impedance match between the antenna system and the wireless communication device.

The wireless communication system of the invention in one preferred embodiment includes having the antenna system directly mounted to the dielectric material comprising a dielectric substrate.

In yet another alternative preferred embodiment the invention further includes having the antenna system of the wireless communication system of the invention mounted on a backing layer intermediate the dielectric material which comprises a dielectric substrate and the antenna system, the backing layer being attached to the dielectric substrate.

DETAILED DESCRIPTION OF THE INVENTION

From the above it has been established that, if each tag could be tuned individually, using variable capacitors and inductors, or by changing the arm length, the tag could be made to work on any block of material having a dielectric constant. That cannot be done practically, but if the value and nature of the capacitors and inductors in the matching network are printed next to the antenna, and the elements that adjust the length of the arms, are a function of the substrate dielectric constant itself, with proper design, the tag could then adjust itself.

Figure 1:
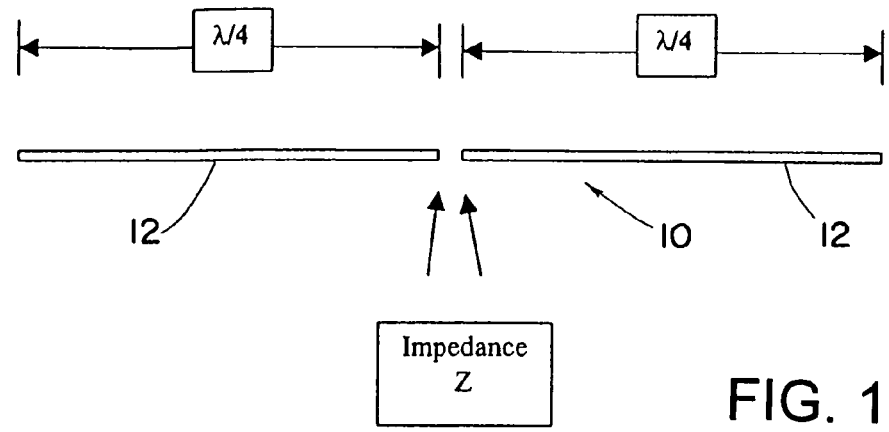
FIG. 1 is an idealized dipole antenna in free space.

To illustrate further the concepts and preferred embodiments of the present invention, consider as an illustrative example, a simple half wave dipole antenna 10 as shown in FIG. 1. In free space, in its simplest form, the antenna will operate efficiently at the frequency where the two elements 12 are of equal length and are a quarter of a wavelength in the medium in which it is placed. The impedance Z of such an antenna structure is 77 ohms resistive.

However, if we were to take this antenna and place it on a surface of a given thickness and dielectric constant, the antenna would change its operating characteristics. The exact nature of the change in operating characteristics will depend on the specific antenna, but, in general, the optimum operating frequency range of the antenna will be reduced. The change manifests itself in a number of ways:

The antenna becomes reactive.

The radiation resistance changes, and may cause the antenna efficiency, expressed as the ratio of radiation resistance to the sum of loss resistance and radiation resistance, to drop.

As a result of the above, the impedance match between the RFID chip and antenna will degrade; leading to mismatch loss and hence loss of optimum frequency operating range for the antenna structure.

To mitigate the above effects, two main methods are available:

1) To introduce an impedance matching network between the chip and antenna which impedance matches the two, maximizing power transfer between the chip and the antenna.

2) To change the effective length of the antenna so it stays at the resonant condition. These methods may be used separately or in combination to form a hybrid of the two.

Consider the antenna as a two terminal device with a complex impedance $Z_a$; the RFID chip is also a two terminal device with a complex impedance $Z_c$. For optimum power transfer the two should be matched; that is, $Z_a$ 'sees' the complex conjugate of itself. To transform $Z_c$ to the complex conjugate of $Z_a$ the invention provides a structure of elements called an impedance matching network. An impedance matching network can consist of a broad variety of lumped (capacitors, inductors, transformers) or transmission line elements; for this non-limiting example case we will only consider lumped elements, as these are more compact and easier to model and discuss than transmission line elements.

To make an impedance matching network that alters its characteristics with the dielectric constant and thickness of the substrate material on which it is mounted, the invention preferably uses a few basic mechanisms. The most basic, a capacitor, is illustrated in FIG. 2.

Figure 2:
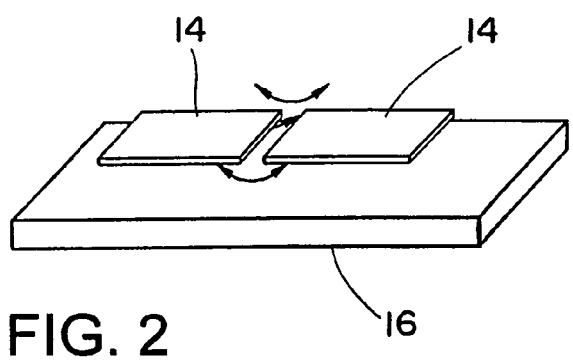
FIG. 2 is a capacitor shown mounted on a dielectric material.

In FIG. 2, there is shown two conductive plates 14 mounted or printed on a substrate 16. The capacitance between these plates is a function of the separation, size and, importantly, the dielectric constant of the substrate. In general, as the relative dielectric constant ($E_r$) increases, so will the capacitance C between the plates.

Figure 7:
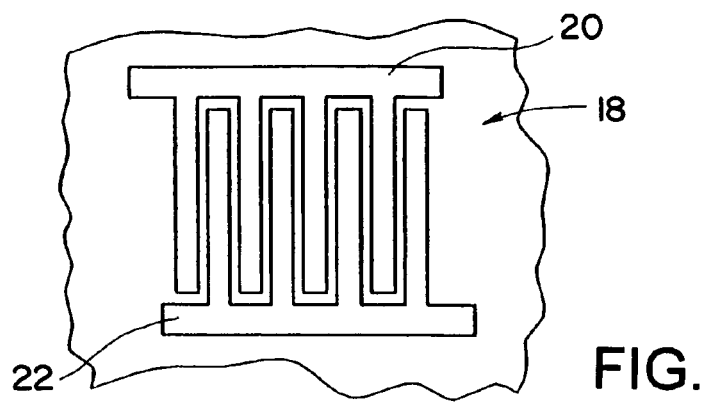
FIG. 7 is an inter-digital capacitor.

One specific type of capacitor that embodies the present invention is shown in FIG. 7. The capacitor 18 is formed by the cross coupling of electromagnetic fields formed between the capacitor "fingers" 20, 22 and is generally referred to as an inter-digital capacitor. The value of the capacitor is a function of the spacing between the fingers, the number of fingers, the dimensions of the fingers, and critically, the dielectric constant of the material on which the capacitor is attached.

Figure 8:
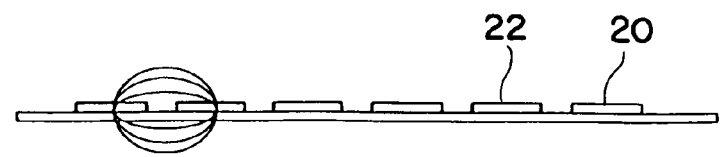
FIG. 8 is a cross-sectional view taken along the line 7—7 of FIG. 7 in the direction shown.

Looking at a cross section through the capacitor of FIG. 7 as illustrated in FIG. 8, we can see where the electric field is flowing and where it is concentrated.

First, consider the original condition, where the tag, with the printed inter-digital capacitor, is in air. The dielectric constant between alternate fingers is that of the 100 μm film discussed previously. Capacitance between fingers of the capacitor is a function of the dielectric constant around the fingers as the electric field spreads out, so it will have an initial value of $C_1$.

Figure 9:
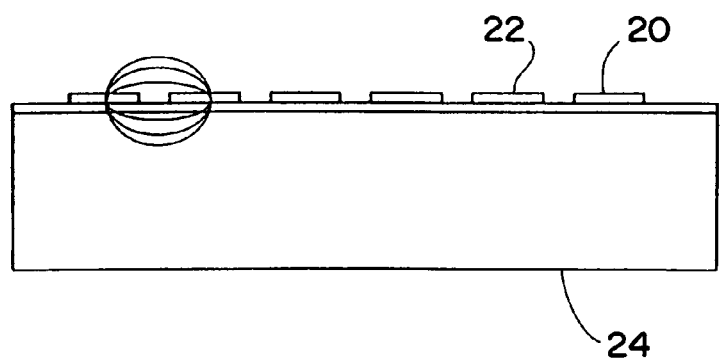
FIG. 9 is a cross-sectional view similar to that of FIG. 8 where the capacitor is mounted on a thicker material than that of the capacitor in FIG. 8.

FIG. 9 illustrates what happens when the capacitor is placed on a 30 mm thick block 24, which has a dielectric constant of anywhere between 2 and 7.

Now the electric field also is flowing in the block, and hence there is cross coupling between fingers of the capacitor. The capacitance $C_2$ is affected by the presence of the block, and critically by the dielectric constant of the material. Thus this arrangement comprises a component having a capacitance (C) that is a function of the relative dielectric constant of the block on which it is mounted, i.e., $C=f(Er)$, where Er is the relative dielectric constant of the block. The component capacitance will also be a function of the block thickness as a thinner block will have less of an electromagnetic field in it, so will, for a given Er, increase the capacitance by a lesser amount.

Figure 10:
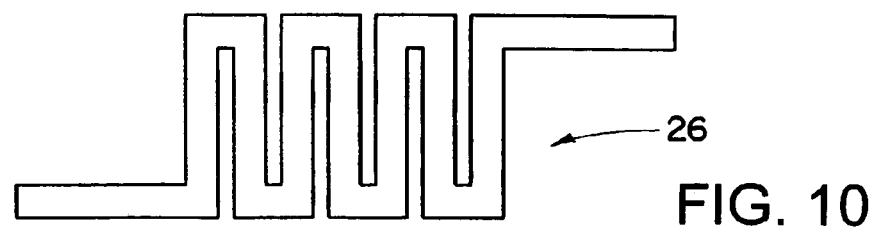
FIG. 10 is a meander inductor.

For inductors, a number of structures are possible; the simplest is a spiral or meander inductor 26 as shown in FIG. 10. This structure has a self-resonance, due to the capacitance between the turns; hence the net inductance value can also be made a function of substrate $E_r$.

In air, this meander inductor component will have a certain value of inductance, L. When it placed on higher dielectric constant materials of significant thickness, the capacitive cross coupling between meanders increases, causing a reduction in overall inductance.

Figure 11:
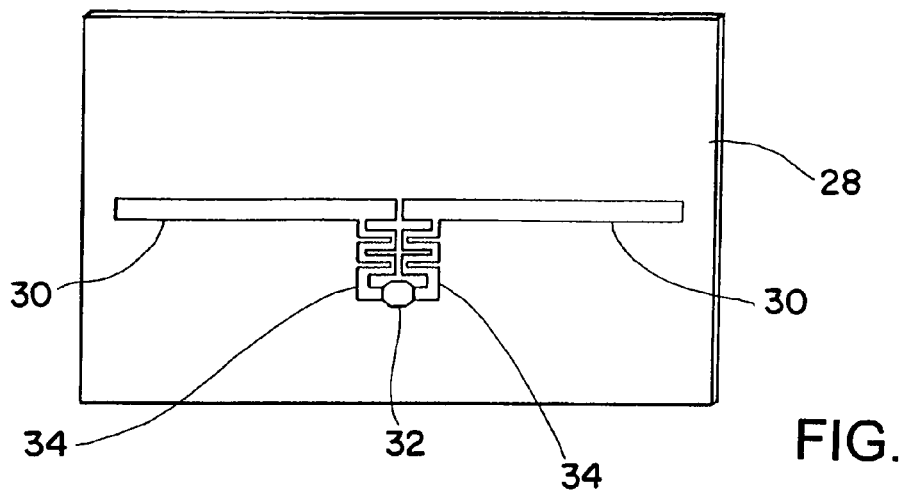
FIG. 11 is an RFID tag structure embodying the present invention and using meander inductors.

A simplified illustration of how this meander inductor component is used in a preferred embodiment of the present invention is illustrated in FIG. 11 where a dipole antenna 28 with elements 30 is connected to an RFID chip 32 through meander inductors 34. The antenna, inductors and chip are attached to a dielectric material 36 by being printed thereon, glued thereto, or mounted thereon in any of the customary ways.

Figure 12:
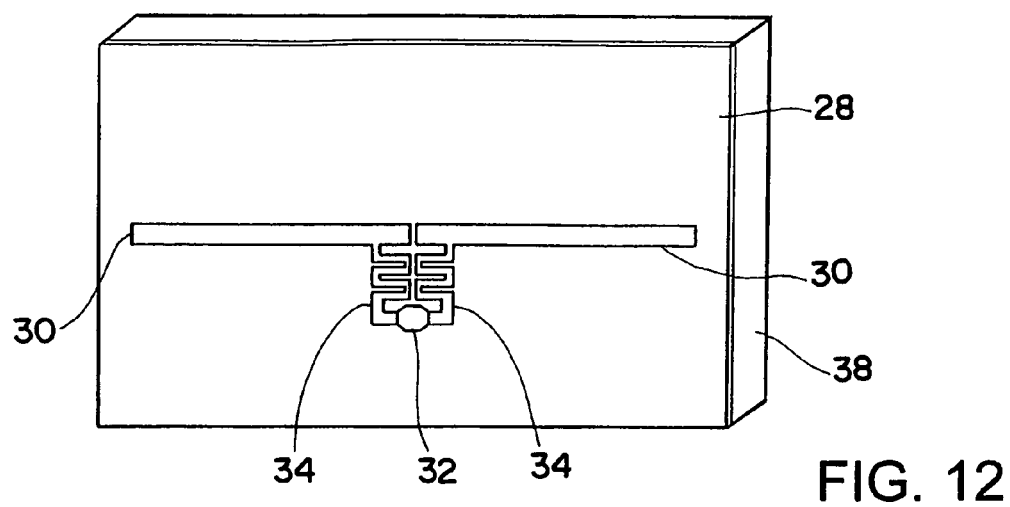
FIG. 12 is an RFID tag structure embodying the present invention similar to that shown in FIG. 11 where the tag is mounted on a thicker material than that of the tag in FIG. 11; and, FIG. 13 is an RFID tag embodying the present invention and incorporating a folded dipole antenna structure.

FIG. 12, like FIG. 11, illustrates where meander inductors 34 have been added between the dipole antenna 28 and chip 32, as previously, in air (or on the lowest dielectric constant $E_r$ on which the tags is to be mounted), the chip, through the inductors, and the dipole are a conjugate match to each other.

As before, if the dipole antenna 28 is placed on a higher dielectric constant $E_r$ substrate 38, the antenna now is too long at the chosen operating frequency. This manifests itself primarily by the antenna becoming inductive, that is, +jX increasing. Without compensation between the antenna and the chip, the impedance match and hence tag performance would degrade. However, the meander inductors have reduced the inductance, so they present a smaller +jX to the circuit, so with proper design a good match is maintained.

The use of a single element as discussed above shows the principle of a component's value being dependant on the characteristics of the substrate on which it is placed. A number of other components, which can be formed on a film next to an antenna that will react to the varying dielectric constant of the substrate material and its thickness, can be made, including multiple capacitors, inductors and transmission line elements (which can act as transformers), acting in parallel or series with one another to provide a substrate dependant variable reactance. These substrate dependant variable reactance components can be used to re-tune and re-match the antenna/chip combination, to maintain performance for some antenna types over a certain range of substrate characteristics.

However, using these components alone is not always the best solution. Another approach, also embodying the present invention, is to change the effective length of an antenna, and some simple preferred methods of doing this are now described.

It has been established that surface features of a structure can react to the substrate. It has also been shown that to re-tune an antenna under some circumstances it would be useful to change the effective length. The present invention includes constructions that use a surface feature to re-tune the antenna.

Figure 13:
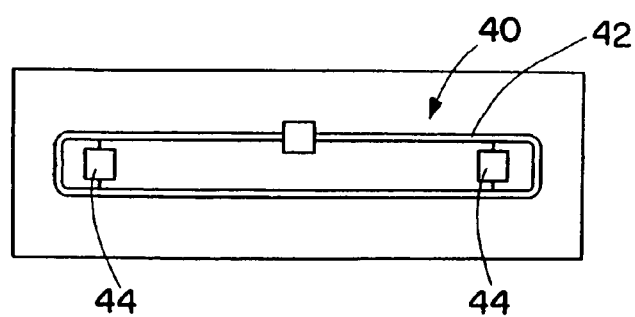

For this purpose, one of the simplest antennas to consider will be the folded dipole 40, as illustrated in FIG. 13.

Initially, the total length of the loop 42 of the folded dipole antenna is set to provide a good match at the minimum dielectric constant the tag is designed to operate with, as an example, a 30 mm block having a dielectric constant of $E_r=2$.

The adaptive elements 44 are preferably a printed series tuned circuit, consisting of an inductor, which is a simple meander of narrow line, and an inter-digital capacitor as discussed and illustrated previously. The value of the inductor and capacitor is such that, on materials having a dielectric constant of $E_r=2$, the resonance frequency is above 915 MHz, as the capacitor value is low. Now if the complete tag is placed on a 30 mm substrate having a dielectric constant of $E_r=4$, the correct length of the loop for the folded dipole is now shorter. However, the capacitor inside the adaptive element has increased in value, making the loop resonant at 915 MHz. The adaptive capacitive element now acts like a short circuit, providing a reduced length path for the RF current which is ideally exactly the path length to make the antenna correctly matched to the chip on materials having a dielectric constant of $E_r=4$.

This is an example using substrate properties as embodied in the present invention to adapt the effective length of an antenna. Alternately, distributed versions can be envisaged, where the inductance and capacitance are spread along the antenna length.

All values and numbers in the examples are intended for guidance only and do not represent real antenna and RFID tags designs.

These capacitive and inductive elements can be used in series and/or parallel combinations and can potentially, combined with a selected antenna design, allow the impedance match to be adjusted as the substrate $E_r$ varies, to allow the antenna performance to be maintained.

An alternative structure would be one that adjusts the effective length of the antenna. When an antenna is placed on or in a medium of a different $E_r$, the wavelength of a defined frequency changes. The ideal length for that antenna in the medium, to obtain a low or zero reactance and useful radiation resistance, would be shorter.

Therefore an antenna that reduces its effective length as the substrate dielectric constant varies would provide compensation. A concept for structure that can achieve this is shown below in FIG. 3. This is a non-limiting example as a number of other design schemes are also possible using the inventive principles of the present invention.

Figure 3:
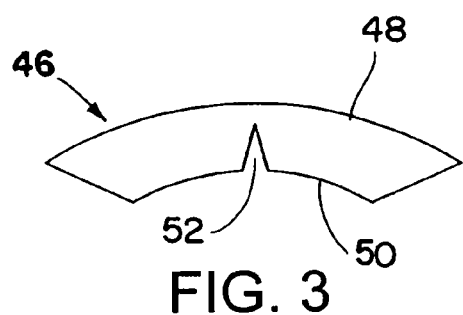
FIG. 3 is an antenna structure that embodies the present invention to reduce its effective length as the dielectric constant of the material on which it is mounted varies.
Figure 4:
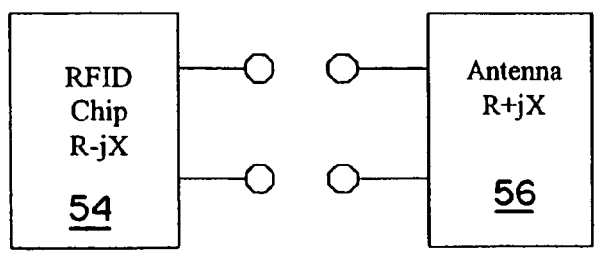
FIG. 4 is a block diagram of an RFID tag.
Figure 5:
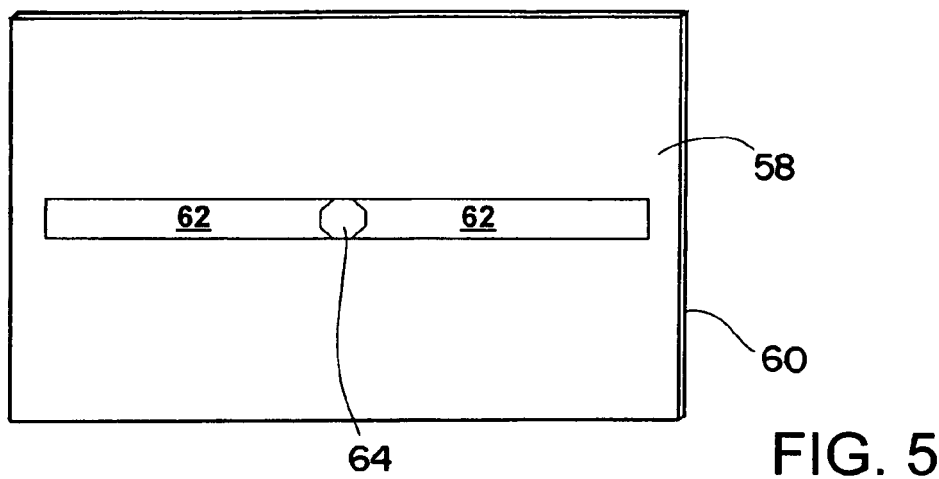
FIG. 5 is a block diagram of an idealized non-adaptive RFID tag mounted on a material having a small dielectric constant value.
Figure 6:
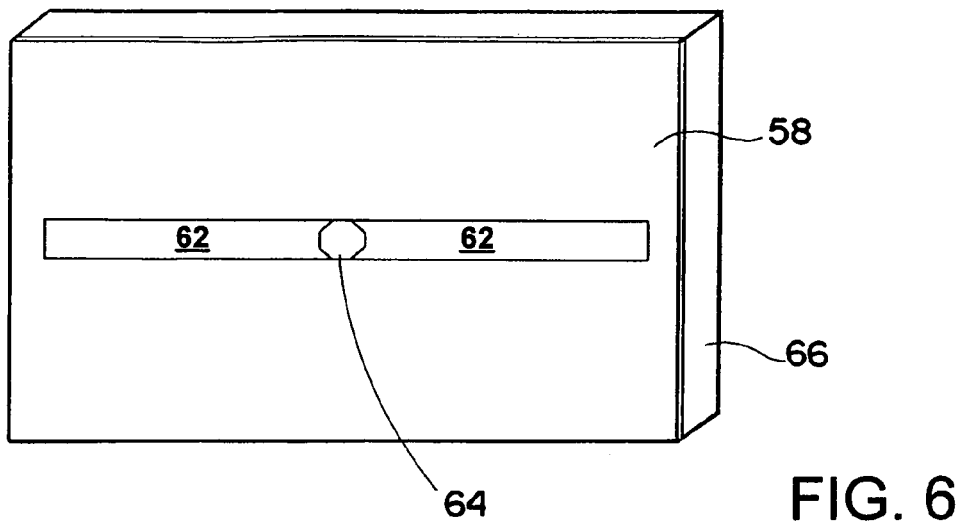
FIG. 6 a block diagram of a non-adaptive RFID tag mounted on a material having a larger dielectric constant value than that of the material in FIG. 5.

Here in FIG. 3, is shown a curved section of a rectangular cross section conductor 46 designed to be placed on a variable $E_r$ substrate. This would form part of the two arms of a dipole antenna. More than one section may be used. The conductor 46 has potentially two paths for the current to flow; the outer curve 48 and the inner curve 50. The length of the transmission path is actually different between these two curves. The slit 52 acts as a capacitor; as the substrate $E_r$ increases in its dielectric constant value, the capacitance between the two radiating sections likewise increases, but the effective transmission path decreases in length.

Alternatively, the cross coupling between a simple wave format structure could also be designed to provide compensation.

Certain modifications and improvements will occur to those skilled in the art upon a reading of the foregoing description. It should be understood that the present invention is not limited to any particular type of antenna design or arrangement such as monopole or dipole antennas. One of ordinary skill in the art will recognize that there are different manners in which these elements described above can provide to accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

What is claimed is:

1. A wireless communication system in combination with a dielectric material, comprising:
   the dielectric material;
   the wireless communication system mounted in electrical proximity to the dielectric material, comprising:
      a wireless communication device;
      an antenna system comprising at least one conductive tab, including one or both of the following:
         (a) a plurality of electrical components selected to form an impedance matching network, coupled to said at least one conductive tab and said wireless communication device wherein the electrical components electrically interact with the dielectric material to maintain a substantial impedance match between the antenna system and the wireless communication device; and,
         (b) a structural element forming a frequency selective by-pass trap circuit formed in said conductive tab and electrically interacting with the dielectric material to maintain a substantial impedance match between the antenna system and the wireless communication device;
      wherein the one or both of the plurality of electrical components and the structural element are configured to self-compensate for different electrical characteristics of different dielectric materials, through electrical cross-coupling of conductive parts of the antenna system, to maintain the substantial impedance match for different dielectric materials.

2. The combination as in claim 1 wherein said plurality of electrical components includes a capacitor whose electrical value is varied by interaction with the dielectric material on which said at least one conductive tab is placed in electrical proximity with.

3. The combination as in claim 2 wherein said capacitor is an interdigital capacitor.

4. The combination as in claim 1 wherein said plurality of electrical components includes an inductor.

5. The combination as in claim 4 wherein said inductor is a meander inductor.

6. The combination as in claim 1 wherein said impedance matching network has at least one circuit of capacitive and inductive electrical components in series intermediate said at least one conductive tab and the wireless communications device.

7. The combination as in claim 1 wherein said impedance matching network has at least one circuit of capacitive electrical components in series intermediate with said at least one conductive tab and the wireless communications device.

8. The combination as in claim 1 wherein said impedance matching network has at least one circuit of inductive electrical components in series intermediate with said at least one conductive tab and the wireless communications device.

9. The combination as in claim 1 wherein said structural element is a capacitor.

10. The combination as in claim 9 wherein said capacitor is an interdigital capacitor.

11. The combination as in claim 1 wherein said structural element is a gap formed in the conductive tab that electrically interacts with the dielectric material to form a capacitive element providing a selective by-pass trap circuit formed in said conductive tab.

12. The combination as in claim 1 wherein the structural element is an inductor.

13. The combination as in claim 12 wherein said Inductor is a meander inductor.

14. The combination as defined in claim 1, wherein the dielectric material comprises a dielectric substrate, and the antenna system is directly mounted to the dielectric substrate.

15. The combination as defined in claim 1, wherein the dielectric material comprises a dielectric substrate, and the antenna system is mounted on a backing layer intermediate the dielectric substrate and the antenna system, the backing layer being attached to the dielectric substrate.

16. An antenna system, useful with a wireless communications device, that self-compensates for being placed in electrical proximity to a dielectric material to maintain a substantial impedance match between the antenna system and the wireless communications device, comprising:
   at least one conductive tab forming an antenna for receiving and radiating radio frequency energy, said at least one conductive tab adapted for placement in electrical proximity to the dielectric material; and,
   a plurality of electrical components selected to form an impedance matching network coupled to said at least one conductive tab and the wireless communications device, said electrical components further electrically interacting with the dielectric material on which said at least one conductive tab is placed in electrical proximity with, to vary, depending upon electrical characteristics of the dielectric material, the individual impatience values of said electrical components to maintain a substantial impedance match between said at least one conductive tab and the wireless communications device;
   wherein in operation conductive parts of the antenna system electrically cross couple to maintain the substantial impedance match.

17. An antenna system as in claim 16 wherein said plurality of electrical components includes a capacitor whose electrical value is varied by interaction with the dielectric material on which said at least one conductive tab is placed in electrical proximity with.

18. An antenna system as in claim 17 wherein said capacitor is an interdigital capacitor.

19. An antenna system as in claim 16 wherein said plurality of electrical components includes an inductor.

20. An antenna system as in claim 19 wherein said inductor is a meander inductor.

21. An antenna system as in claim 16 wherein said impedance matching network has at least one circuit of capacitive and inductive electrical components in series intermediate said at least one conductive tab and the wireless communications device.

22. An antenna system as in claim 16 wherein said impedance matching network has at least one circuit of capacitive electrical components in series intermediate with said at least one conductive tab and the wireless communications device.

23. An antenna system as in claim 16 wherein said impedance matching network has at least one circuit of inductive electrical components in series intermediate with said at least one conductive tab and the wireless communications device.

24. An antenna system, useful with a wireless communications device that self-compensates for being placed in electrical proximity to a dielectric material to maintain a substantial impedance match between the antenna system and the wireless communications device, comprising:

a conductive tab forming an antenna for receiving and radiating radio frequency energy, said conductive tab adapted for placement in electrical proximity to the dielectric material; and, a structural element forming a frequency selective by-pass trap circuit formed in said conductive tab providing an impedance matching network coupled to said conductive tab and the wireless communications device, said frequency selective by-pass trap circuit electrically interacting with the dielectric material to self-compensate for electrical characteristics of different dielectric materials, to maintain a substantial impedance match between said conductive tab and the wireless communications device;

wherein in operation conductive parts of the antenna system electrically cross couple to maintain the substantial impedance match.

25. An antenna system as in claim 24 wherein said structural element is a capacitor.

26. An antenna system as in claim 25 wherein said capacitor is an interdigital capacitor.

27. An antenna system as in claim 24 wherein said structural element is a gap formed in the conductive tab that electrically interacts with the dielectric material to form a capacitive element providing a selective by-pass trap circuit formed in said conductive tab.

28. An antenna system as in claim 24 wherein structural element is an inductor.

29. An antenna system as in claim 28 wherein said inductor is a meander inductor.

30. An antenna system, useful with a wireless communications device that self-compensates for being placed in electrical proximity to a dielectric material to maintain a substantial impedance match between the antenna system and the wireless communications device, comprising:

a pair of conductive tabs forming a dipole antenna for receiving and radiating radio frequency energy, each of said conductive tabs adapted for placement in electrical proximity to the dielectric material; and, a plurality of electrical components selected to ban an impedance matching network coupled to said conductive tabs and the wireless communications device, said electrical components further electrically interacting with the dielectric material on which said tabs are placed in electrical proximity with, to vary, depending upon electrical characteristics of the dielectric material, the individual impedance values of said electrical components to maintain a substantial impedance match between said conductive tabs and the wireless communications device;

wherein in operation conductive parts of the antenna system electrically cross couple to maintain the substantial impedance match.

31. An antenna system as in claim 30 wherein said plurality of electrical components includes a capacitor.

32. An antenna system as in claim 31 wherein said capacitor is an interdigital capacitor.

33. An antenna system as in claim 30 wherein said plurality of electrical components includes an inductor.

34. An antenna system as in claim 33 wherein said inductor is a meander inductor.

35. An antenna system as in claim 30 wherein said impedance matching network has at least one circuit of capacitive and inductive electrical components in series intermediate at least one of said conductive tabs and the wireless communications device.

36. An antenna system as in claim 30 wherein said impedance matching network has at least one electrical component acting as a capacitive shunt between said two conductive tabs.

37. An antenna system as in claim 30 wherein said impedance matching network has at least one circuit of capacitive and inductive electrical components in series intermediate at least one of said conductive tabs and the wireless communications device, and further has at least one electrical component acting as a capacitive shunt between said two conductive tabs.

38. An antenna system as in claim 30 wherein said impedance matching network has at least one circuit of capacitive electrical components in series intermediate with at least one of said conductive tabs and the wireless communications device.

39. An antenna system as in claim 30 wherein said impedance matching network has at least one circuit of inductive electrical components in series intermediate with at least one of said conductive tabs and the wireless communications device.

* * * * *